SELECTIVE RECEIVER FOR COMMUNICATION BY PHASE SHIFT

Filed July 17, 1959 3 Sheets-Sheet 1

INVENTOR
EMORY LEON CHAFFEE

BY

ATTORNEY

INVENTOR
EMORY LEON CHAFFEE

BY

ATTORNEY

Aug. 29, 1967 E. L. CHAFFEE 3,339,143

SELECTIVE RECEIVER FOR COMMUNICATION BY PHASE SHIFT

Filed July 17, 1959 3 Sheets-Sheet 3

INVENTOR
EMORY LEON CHAFFEE

BY [signature]

ATTORNEY

United States Patent Office 3,339,143

Patented Aug. 29, 1967

3,339,143

SELECTIVE RECEIVER FOR COMMUNICATION BY PHASE SHIFT

Emory Leon Chaffee, Belmont, Mass., assignor to Ralph G. Lucas, Nathaniel L. Leek, and The National Shawmut Bank, executors of the estate of John H. Hammond, Jr., deceased Filed July 17, 1959, Ser. No. 827,784

6 Claims. (Cl. 325—320)

This invention relates to radio communication by phase-shift modulation and more particularly to a novel type of receiver for the detection of small phase-shift modulation for code communication.

The object of the invention is to provide a receiver which is more sensitive to the reception of the message and at the same time less affected by static interference than other types of receivers.

Another object of the invention is to provide a stable receiver which can derive a message from a smaller change in the characteristic of the transmitted wave than for amplitude or frequency modulation systems and which is therefore more selective and more secret than other types of receivers.

Radio communication over great distances is generally more reliable when the carrier wave is of very low frequency (VLF) of the order of 10 to 20 kilocycles. The transmission of such waves is principally by ground wave and is therefore less affected by changes in the height of the ionosphere. However, at these low frequencies static interference is much greater than at the higher frequencies.

The messages are generally conveyed by amplitude or frequency modulation of the carrier wave as by voice modulation for radio telephony or by key shift of frequency for code transmission. In these communication systems the receiver circuits must be sufficiently broad to take in the full band width of the transmission. If the modulation is by voice the band width is twice or equal to the highest voice frequency according as to whether the transmission is by double or single side-band modulation. Such receivers, because of their relatively large band, take in a large amount of interfering static noise.

If the message is sent by key shift of frequency or by on and off of the carrier wave, the band width of the receiver may be very small to take in only the single frequency corresponding to the key-down condition but if the band is narrow the back wave for the key-up condition may not be received. Even though the noise is reduced for a narrow band receiver for key shift transmission, the message is easily received by an enemy and the system is not secret.

The present invention provides a receiver which will detect a message sent by a small shift of phase, say of 45° or 90°, the frequency of the carrier being the same for both the key-up and key-down conditions. The frequency changes only momentarily during the transitions from the key-down to the key-up, or the reverse, conditions. The receiver need not be responsive to these frequency changes. A message sent by such a small shift of the characteristic of the carrier wave could not be received by the usual type of receiver such as the superheterodyne receiver for amplitude or frequency modulation, nor by the heterodyne receiver for code reception by key shift of frequency.

A brief description of the receiver of this invention follows. The input circuit for the reception of the carrier wave may preferably be a sharply tuned coupled-circuit system to provide good efficiency of reception of the carrier wave and at the same time good noise exclusion. The carrier wave is then increased by a suitable amplifier.

The amplified carrier wave is then heterodyned by two waves, generated within the receiver, one of frequency, say, 1000 cycles greater than the carrier frequency and the other of frequency 1000 cycles less than the carrier frequency. The two beat frequencies of 1000 cycles each are produced in a balanced modulator system comprising two channels. The two outputs from the two channels are connected so as to give the sum of the amplitudes of the two beat oscillations for the key-down condition, and the difference of the amplitudes of the two beat oscillations for the key-up condition. There being two channels, the noise, which is of random phase with respect to the two heterodyne frequencies, is partly cancelled by the opposition of the two channels.

When the phase of the carrier wave shifts with respect to the phases of the two heterodyne frequencies, the phase of one beat frequency oscillation shifts one way while the phase of the other beat frequency oscillation shifts in the opposite direction. This shift of the phase of one beat frequency with respect to the shift of phase of the other beat frequency is used to lock the two heterodyning oscillations to the carrier frequency for the key-up condition.

The two beat frequency oscillations of the same frequency when added for the key-down condition may be heard in telephone receivers, or may be rectified to actuate some other form of indicator.

A relay or an equivalent device cuts off the frequency-locking devices when the key is in the down condition. Or, alternatively, if the key down condition involves a phase shift in one direction for the dots and in the opposite direction for the dashes, the average frequency remains the same and is the frequency with which the two heterodyne frequencies are locked.

The double heterodyne receiver gives a four fold increase in signal strength and at the same time a reduction by a factor of at least two in the noise as compared with a single heterodyne receiver. Thus an over all gain of a factor of at least eight in the signal to noise ratio results from the use of two heterodynes. In addition, the two-heterodyne receiver provides a much more sensitive phase detection means and a more accurate phase-lock system.

The invention also consists in certain new and original features of construction and combinations of parts hereinafter set forth and claimed.

The nature of the invention as to its objects and advantages, the mode of its operation and the manner of its organization, may be better understood by referring to the following description, taken in connection with the accompanying drawings forming a part thereof, in which FIG. 1 shows a frequency spectrum of the signal and the two heterodyne oscillations;

Like reference characters denote like parts in the several figures of the drawing.

In the following description parts will be identified by specific names for convenience, but they are intended to be generic in their application to similar parts.

Figure 1:
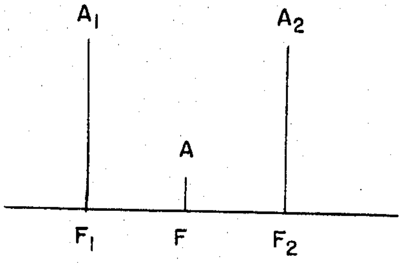

Referring to FIG. 1, A indicates the magnitude of the received carrier wave of frequency F. The two equal lines $A_1$ and $A_2$ represent the approximate magnitudes of the two heterodyning oscillations of frequencies $F_1$ and $F_2$ which are generated within the receiver and combined with A.

Figure 2:
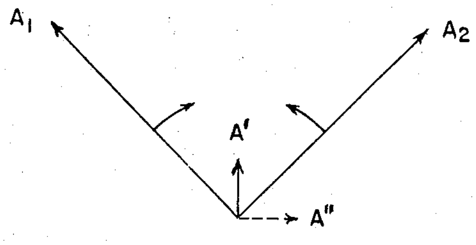
FIG. 2 is a vector diagram showing the phase relations between the signal and the two heterodyne oscillations.

A vector relation of these three waves upon which the operation of the receiver depends is shown in FIG. 2. If the angular velocity of the carrier wave A is subtracted from the angular velocities of all three waves and the differences used in the construction of the vector diagram of FIG. 2, the vector for A will be stationary as shown at A′, where A′ corresponds to the position of A for the key-up condition. The oscillations $A_1$ and $A_2$, when in the proper locked condition with respect to A′, are shown at $A_1$ and $A_2$ in FIG. 2. Vector $A_1$, being of lower frequency than that of vector A′, rotates clockwise with an angular velocity corresponding to the frequency difference $F-F_1$, and, similarly, vector $A_2$, being of higher frequency than that of A, rotates counter clockwise with an angular velocity corresponding to the frequency difference $F_2-F$. These two frequency differences are the same, and equal to 1000 cycles per second in the example given, but may be of any suitable frequency. The phase between A′ and $A_2$ and A′ and $A_1$ is equal to the phase between A′ and $A_2$ and hence the two beat waves of frequency 1000 cycles per second are in phase with each other and, as will be explained later, cancel each other in the output of the receiver.

When the key at the transmitter is depressed the phase of A′ is advanced or retarded by some value such as 45 or 90 degrees. If the phase of A is retarded by 90 degrees, for example, vector A″ represents the key-down condition. Then the phase of beat oscillation $F-F_1$ is increased by 90 degrees while the phase of beat oscillation $F_2-F$ is retarded by 90 degrees thus causing the two beat frequencies to be opposite in phase. These two beat frequency oscillations now add to produce a signal as will be explained later.

Figure 3:
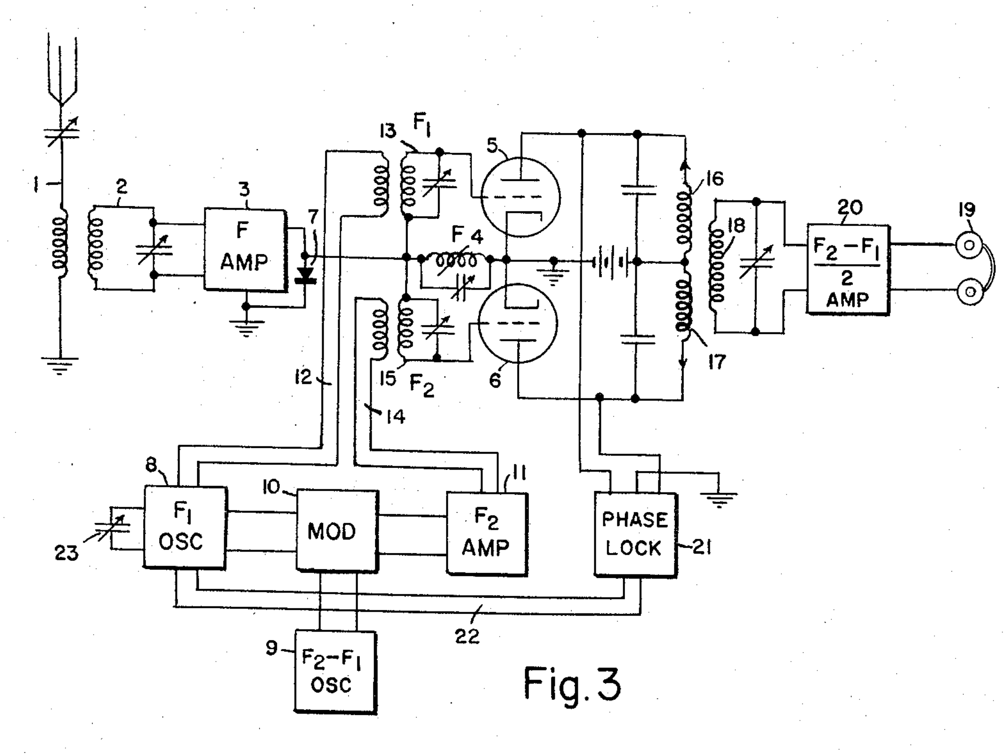
FIG. 3 is a schematic circuit diagram of one form of the receiver.

In FIG. 3, which represents schematically the circuits of one form of the receiver, the signal A is received by antenna circuit 1, and tuned secondary circuit 2. The coupling between circuits 1 and 2 should be less than critical and the resistance of the circuits as small as possible to provide a narrow band of reception. The signal A is amplified in block 3 and then is fed to circuit 4, tuned to frequency F. The voltage of frequency F developed across circuit 4 is impressed on the grids of modulator tubes 5 and 6.

A limiter 7 is shown which, as in FM receivers, clips off the large noise pulses. It may be desirable to connect a second rectifier across rectifier 7 to clip noise pulses of the opposite sign.

Oscillations of frequency $F_1$ are generated by an oscillator in block 8. Oscillations of frequency $F_2-F_1$ are generated by an oscillator in block 9. These two oscillations from blocks 8 and 9 are mixed in a modulator in block 10 giving rise to oscillations of a frequency $F_2$, which are amplified in block 11.

Oscillations of frequency $F_1$ from block 8 are fed through line 12 to circuit 13 which is tuned to $F_1$. Thus a voltage of frequency F in circuit 4 is added to a voltage of frequency $F_1$ in circuit 13 and the sum impressed upon the grid of modulator tube 5. Similarly oscillations of frequency $F_2$ from block 11 are fed through line 14 to circuit 15 which is tuned to $F_2$. Thus a voltage of frequency F in circuit 4 is added to a voltage of frequency $F_2$ in circuit 15 and the sum impressed upon the grid of modulator tube 6.

Because of the non-linear characteristics of tubes 5 and 6 a current of frequency $F-F_1$ is caused to flow in coil 16, and a current of frequency $F_2-F$ is caused to flow in coil 17. If frequency $F_1$ is properly controlled the phase relation shown in FIG. 2 exists for the key-up condition represented by A′, and the two oscillations of equal frequencies $F-F_1$ and $F_2-F$ induce no voltage in coil 18. Hence there is no signal in the indicator which is shown as a telephone receiver in FIG. 3.

When by depressing the key A′ shifts to A″, the two voltages of frequencies $F-F_1$ and $F_2-F$ induced in coil 18 add. This voltage may be amplified in block 20 and can be made to operate an indicator, which is represented as a telephone receiver 19 in FIG. 3. The intensity of the signal will be four times that received if, say, tube 6 is cut off. The noise will be half as great as when only one tube say 5 is active.

Since the phase of the voltage of frequency $F-F_1$ across coil 16 changes in the opposite direction from the changes in phase of the voltage of frequency $F_2-F$ across coil 17, these two voltages provide a sensitive means for controlling frequency $F_1$ to maintain the phases of $A_1$ and $A_2$ with respected to A′ as shown in FIG. 2. This control or lock-in system may be accomplished in any one of a number of well known ways. For example, the two voltages across coils 16 and 17 may operate electronic gates in block 21 in such a way as to provide a control pulse over line 22 to block 8. This control pulse can be made to alter the phase of oscillator $F_1$ in block 8. Such a control or lock-in system is effective and automatic only within a small range of phase variation of oscillator $F_1$ and is inoperative if the frequency of $F_1$ differs much from the lock-in value. Hence, to bring the frequency and phase of the $F_1$ oscillator within control range a manual control 23 of frequency $F_1$ must be provided.

Figure 7:
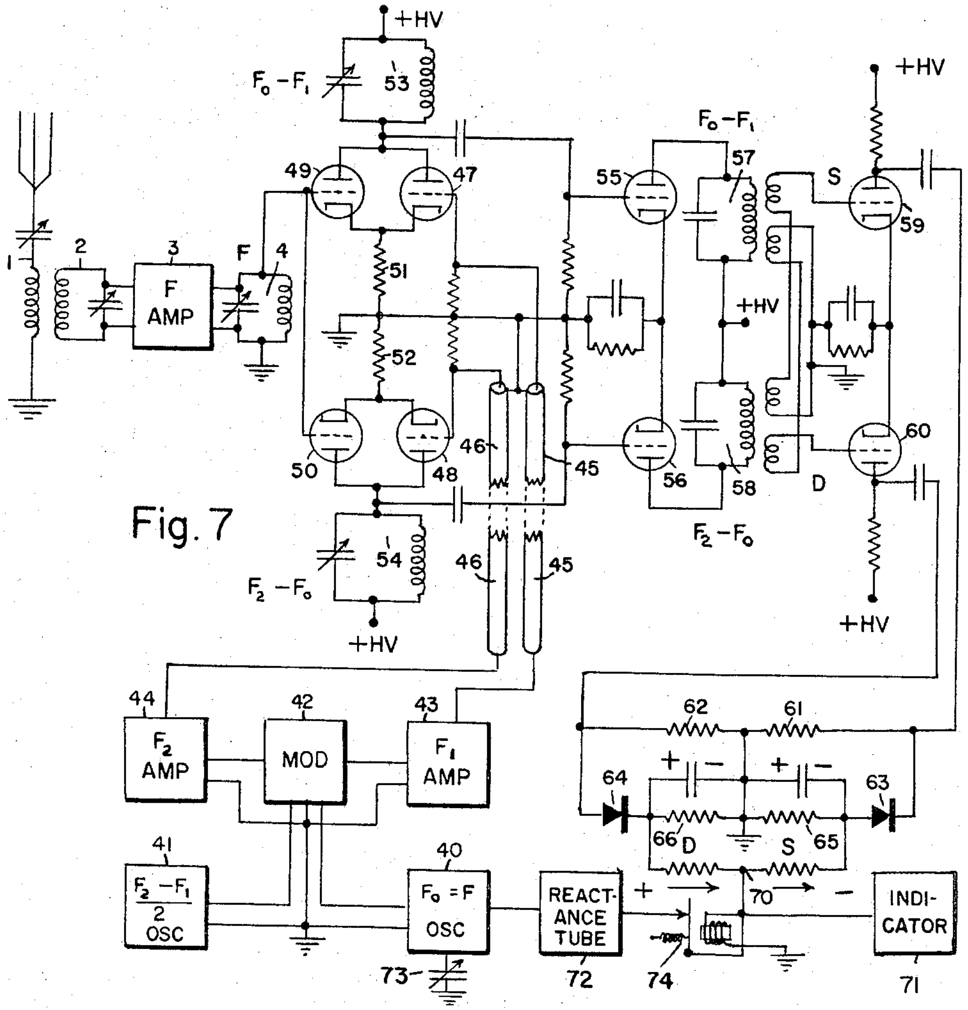
FIG. 7 is a schematic circuit diagram of a second form of the receiver.

Since the control of the frequency of $F_1$ should be active only during the key-up condition, either the key must remain up a large fraction of the time and the system have a slow control characteristic, or else a relay, not shown in FIG. 3 but shown in FIG. 7, should be added to cut off the control during key-down condition. Or, alternatively, if the key-down condition involves phase shifts in both directions from the key-up condition so as to maintain an average phase equal to that for the key-up condition, the lock-in system may require no relay but be active continuously.

It should be noted that whereas the operation of the receiver has been explained assuming that depressing the key changes the phase of A from A′ to A″, the same operation would obtain if the phase of A were advanced 90° instead of retarded 90°.

Figure 4:
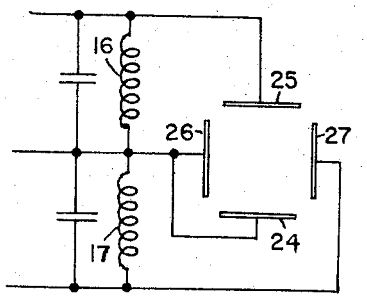
FIG. 4 is a schematic circuit diagram of one form of indicator.
Figure 5:
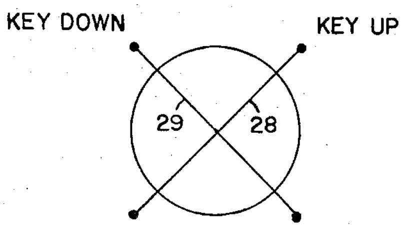
FIG. 5 represents diagrammatically the type of indication given by the indicator of FIG. 4.

While a telephone receiver is shown in FIG. 3 as the indicating device, other indicating devices may be used such as a rectifier and telegraph sounder, or the form shown in FIGS. 4 and 5. In FIG. 4 the voltage across coil 16 is applied between the two deflection plates 24 and 25 of a cathode-ray tube. The voltage across coil 17 is applied between plates 26 and 27. The cathode-ray beam is then deflected in line 28 when the key is up, and will shift in position to line 29 when the key is depressed.

Figure 6:
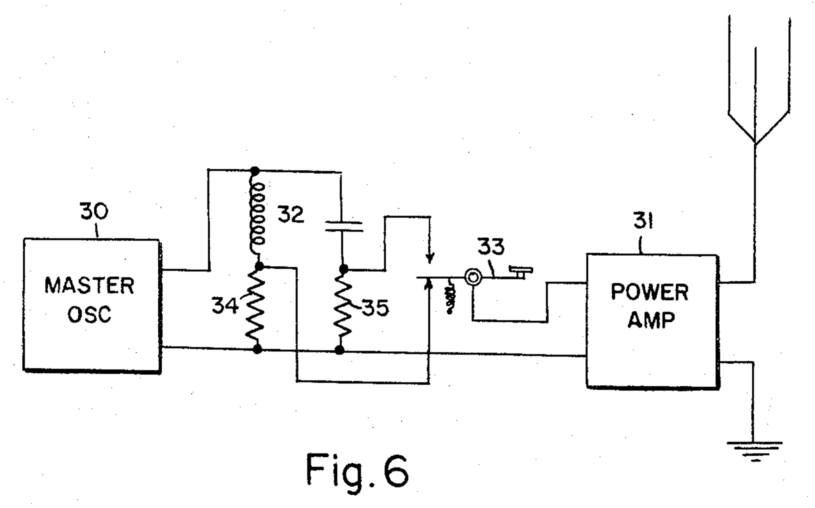
FIG. 6 is a schematic circuit diagram of one form of transmitter of the signal.

While the transmitter is not claimed as a part of this invention, a simple arrangement which would produce the required shift in phase of the carrier wave is shown in FIG. 6. A master oscillator of frequency F in block 30 feeds a voltage to the power amplifier in block 31 by way of phase changing network 32. When key 33 is up the voltage across resistance 34, which lags 45 degrees behind the voltage from block 30, is impressed on the amplifier 31. When the key is depressed the voltage across resistance 35, which is made to be equal in magnitude to the voltage across resistance 34 but advanced in phase by 90 degrees, is impressed on amplifier 31. Thus depressing the key causes a phase advance of 90 degrees but no change in amplitude or, in frequency except during transitions.

A second form of receiver is shown schematically in FIG. 7. The antenna circuits 1 and 2, amplifier 3, and circuit 4 tuned to signal frequency F are the same as in FIG. 3. The principal difference between the receiver shown in FIG. 7 from that of FIG. 3 is in the method of obtaining the heterodyne oscillations $A_1$ and $A_2$, and the frequency control means.

In FIG. 7 oscillations of frequency $F_0$, which will be controlled to be equal to F, are generally in block 40. Oscillations of frequency $$\frac{F_2-F_1}{2}$$

which is the output signal frequency, are generated in block 41. These two oscillations are impressed on a modulator in block 42 giving rise to a voltage of frequency $F_1$, amplified in block 43, and a voltage of frequency $F_2$ amplified in block 44.

A voltage of frequency $F_1$ from block 43 is fed through shielded line 45 to the grid of amplifier tube 47. Similarly, a voltage of frequency $F_2$ from block 44 is fed through shielded line 46 to the grid of amplifier tube 48. The shielded lines 45 and 46 are used to isolate especially oscillator 40 so as to prevent pick-up in the input circuits 1, 2, 3, and 4 from oscillator 40.

A voltage of frequency $F_1$, developed across resistor 51, is combined within detector tube 49 with a voltage of frequency $F_0$ from circuit 4 to produce a component current of frequency $F_0-F_1$. This current passing through circuit 53, which is tuned to frequency $F_0-F_1$, produces a voltage of this frequency on the grid of amplifier tube 55.

Similarly, a voltage of frequency $F_2$, developed across resistor 52 is combined within detector tube 50 with the voltage of frequency $F_0$ from circuit 4. There is thus developed across tuned circuit 54 a voltage of frequency $F_2-F_0$ which is impressed on the grid of amplifier tube 56.

The amplifiers 55 and 56 produce currents in tuned circuits 57 and 58 of frequencies $F_0-F_1$ and $F_2-F_0$, respectively. If the control of the oscillator in block 40 makes $F_0$ equal to F, then the currents in circuits 57 and 58 have frequencies $F-F_2$ and $F_2-F$, respectively, and these two frequencies are the same.

The grid voltage of amplifier tube 59 is equal to the sum of two component voltages derived from circuits 57 and 58, while the grid voltage of amplifier tube 60 is equal to the difference of two components derived from circuits 57 and 58. Hence the output voltages of amplifiers 59 and 60, which exist across resistors 61 and 62, respectively, are proportional to the vector sum and difference of the voltages across circuits 57 and 58.

If the voltages $V_{57}$ and $V_{58}$ across circuits 57 and 58 are in quadrature, the vector sum and difference voltages across resistors 61 and 62 are equal in magnitude even if the voltages $V_{57}$ and $V_{58}$ across circuits 57 and 58 are not equal to each other.

If the voltages $V_{57}$ and $V_{58}$ are of the same or opposite phase, the vector sum and difference are not the same and the alternating voltages across resistors 61 and 62 are different.

Referring to FIG. 7, rectifier 63 produces a unidirectional voltage across resistor 65 roughly proportional to the magnitude of the alternating voltage across resistor 61. Similarly, rectifier 64 produces a unidirectional voltage across resistor 66 roughly proportional to the magnitude of the alternating voltage across resistor 62. If the two unidirectional voltages across resistors 65 and 66 are equal, point 70 is at ground potential. If the two voltages across resistors 66 and 65 are unequal the steady voltage of point 70 is above or below ground potential according to the direction and magnitude of the difference between the voltages across resistors 65 and 66.

Figure 8:
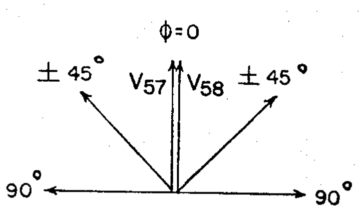
FIG. 8 is a vector diagram of some of the voltages developed in the receiver of FIG. 7.
Figure 9:
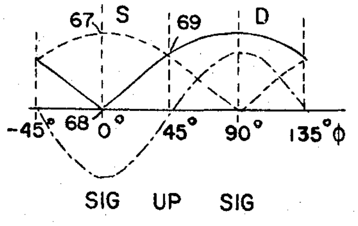
FIG. 9 is a diagram indicating the magnitude of certain voltages developed in the circuits of FIG. 7.

Various phase relations between voltages $V_{57}$ and $V_{58}$ are illustrated in FIG. 8, and the resulting voltages across resistors 65 and 66 indicated by curves S and D in FIG. 9. When $V_{57}$ and $V_{58}$ are in quadrature, corresponding to the key-up condition, the voltages are indicated in FIG. 8 by the notation ±45°. Under this condition the voltages across resistors 65 and 66 are equal as indicated by the ordinates of the two curves S and D over the 45° abscessa in FIG. 9. The voltage of point 70 is then zero as indicated by the dot-dash curve in FIG. 9.

Shiftinng the phase of the carrier by 45 degrees shifts the phase of $V_{57}$ and $V_{58}$ each by 45 degrees. This results in the condition indicated in FIGS. 8 and 9 by the notation $\phi=0°$ or 90°. The voltage of point 70 varies above or below ground potential according to the direction of phase shift from the 45-degree condition.

The voltage of point 70 may be applied to an indicator of suitable form in block 71. This voltage may also act upon a reactance tube in block 72, or an equivalent device, which controls the phase of oscillator $F_0$ in block 40 to lock it into the condition which gives a quadrature relation between voltages $V_{57}$ and $V_{58}$.

The type of phase comparison system shown in FIG. 7 is described by U.S. Patent No. 2,272,840 issued to John Hays Hammond, Jr., and E. S. Purington.

Similar to the system of FIG. 3, the lock-in system described in FIG. 7 has a limited range of action. When the phase or frequency of oscillator $F_0$ in block 40 is not within the range of control, a separate control 73, operated manually or otherwise, is provided.

Since the phase of oscillator $F_0$ in block 40 should be controlled only for the key-up condition, the action of the control device must be interrupted during the key-down condition. This can most simply be effected by a relay 74 which interrupts the circuit to the reactance control tube when the voltage of point 70 rises above a prescribed value, which value is set to be less than the signal during the key-down condition. Or alternatively, as explained previously the key-down condition may be made to cause shifts of phase in both directions so as to maintain an average constant phase equal to that for the key-up condition. In this case a control involving some integration may be continuously active and thus maintain the proper phase of oscillator $F_0$ for the key-up condition.

Since the key-up phase relation of the two heterodyne oscillations $A_1$ and $A_2$ depends upon the phase of both oscillators in blocks 40 and 41, frequency $F_0$ may be harmonically derived from the frequency $$\frac{F_2-F_1}{2}$$

of the oscillator in block 41, and the controls 72 and 73 applied to the oscillator in block 41; or the frequency $$\frac{F_2-F_1}{2}$$

may be derived by step down from oscillation of frequency $F_0$ in block 40 and the controls 72 and 73 applied to block 40 as in FIG. 7.

Although only a few of the various forms in which this invention may be embodied have been shown herein, it is to be understood that the invention is not limited to any specific construction but may be embodied in various forms without departing from the spirit of the invention.

What is claimed is:

1. A receiver responsive to a carrier wave of substantially constant frequency and modulated by a small phase shift corresponding to code signals to be transmitted, said receiver having a sharply tuned received circuit adapted to receive said carrier wave and having two oscillators to produce a pair of heterodyne oscillations having frequencies above and below the frequency of said carrier wave respectively and differing from said carrier wave by the same amount, means causing said oscillations to beat with said carrier wave derived from said tuned circuit to produce a pair of beat notes of identical frequency, means locking said oscillations in a predetermined phase relationship with respect to said carrier wave, and means combining said beat frequencies in an opposite sense when said carrier wave is in a predetermined phase relationship and in an additive sense when the phase of said carrier wave is shifted by an amount not exceeding ninety degrees.

2. In a system of communication in which a code message is conveyed by a a shift of phase of a carrier wave by not over ninety degrees, a receiver comprising a tuned input circuit adapted to receive said carrier, two oscillators to produce a pair of heterodyne oscillations, one having a frequency above and the other below that of the said carrier, means including a pair of circuit channels to cause said heterodyne oscillations to produce two beat oscillations, one in each channel, said beat oscillations being the same in frequency but varying in phase in opposite directions as the phase of the said carrier is changed, means including an output circuit connected to said two circuit channels wherein said beat oscillations add in amplitude for one phase of the carrier and subtract in amplitude for another phase of the carrier, an indicator of the phase shift of said carrier connected to said output circuit, and means operated by the oppositely directed phase shift of said beat oscillations to lock-in the said heterodyne oscillations to said carrier wave for one particular phase relation.

3. A receiver for radio code communication responsive to a small shift in the carrier wave, comprising a sharply tuned circuit adapted to receive said carrier, means producing two heterodyne oscillations having frequencies above and below the frequency of said carrier, two detectors for producing beat frequency oscillations between said carrier and said heterodyne oscillations, means to combine said beat frequency oscillations in a manner to oppose for one phase of the said carrier and to add for a different phase of said carrier, indicator means operated by said combined beat frequency oscillations, and means actuated by the oppositely directed phase shift of said beat frequency oscillation to control the phase of said beat frequency oscillations with respect to the phase of the carrier.

4. A receiver for receiving an interrupted continuous wave radio carrier signal, comprising circuit means responsive to a wave of the frequency of said carrier, means including local oscillators adapted to generate oscillations having frequencies respectively above and below said carrier frequency and differing therefrom by equal amounts, circuit means modulating said oscillations with said carrier wave to produce beat notes of identical frequency but having a phase relationship dependent upon the phase of said carrier, a combining circuit connected to combine said beat notes in opposition when in a predetermined phase relationship and additively when said phase relationship is reversed, circuit means connected to produce a signal in response to said last mentioned phase relationship, and circuit means responsive to a deviation from said first mentioned phase relationship connected to alter the phase of one of said local oscillators in a direction to restore the phase relationship of said beat notes to opposition.

5. A receiver for receiving an interrupted continuous wave radio carrier signal, comprising circuit means responsive to a wave of the frequency of said carrier, means including local oscillators adapted to generate oscillations having frequencies respectively above and below said carrier frequency and differing therefrom by equal amounts, circuit means modulating said oscillations with said carrier wave to produce beat notes of identical frequency but having a phase relationship dependent upon the phase of said carrier, a combining circuit connected to combine said beat notes in opposition when in a predetermined phase relationship and additively when said phase relationship is reversed, circuit means connected to derive from said combining circuit an error signal when the phase relationship of said beat notes differs from opposition and circuit means responsive to said error signal connected to alter the frequency of one of said local oscillators in a sense to restore said condition of opposition.

6. A receiver for receiving an interrupted continuous wave radio carrier signal, comprising circuit means responsive to a wave of the frequency of said carrier, means including local oscillators adapted to generate oscillations having frequencies respectively above and below said carrier frequency and differing therefrom by equal amounts, circuit means modulating said oscillations with said carrier wave to produce beat notes of identical frequency but having a phase relationship dependent upon the phase of said carrier, circuit means connected to combine said beat notes to obtain therefrom sum and difference voltages which are equal when said beat notes are in phase quadrature, circuit means connected to compare said sum and difference voltages to derive therefrom a control voltage which is zero when said sum and difference voltages are equal, and which varies in a positive or negative direction when said sum and difference voltages become unequal due to a change in said beat notes from phase quadrature relationship, and circuit means responsive to said control voltage connected to alter the frequency of one of said local oscillators in a direction to restore said control voltage to zero value.

References Cited

UNITED STATES PATENTS

| | | | |
|---|---|---|---|
| 2,167,480 | 7/1939 | Hansell | 250—8.34 |
| 2,382,590 | 8/1945 | Usselman | 250—8.34 |
| 2,813,974 | 11/1957 | Keall | 250—8.34 |
| 2,833,917 | 5/1958 | Babcock | 250—8.34 |
| 2,839,604 | 7/1958 | Shank | 178—66 |

JOHN W. CALDWELL, *Acting Primary Examiner.*

H. K. SAALBACH, *Examiner.*